US012340935B2

(12) United States Patent
Nakamoto et al.

(10) Patent No.: US 12,340,935 B2
(45) Date of Patent: Jun. 24, 2025

(54) COIL COMPONENT

(71) Applicant: Murata Manufacturing Co., Ltd., Kyoto-fu (JP)

(72) Inventors: Shingo Nakamoto, Nagaokakyo (JP); Kaori Takezawa, Nagaokakyo (JP); Shigeto Yamamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 817 days.

(21) Appl. No.: 17/518,351

(22) Filed: Nov. 3, 2021

(65) Prior Publication Data

US 2022/0148792 A1 May 12, 2022

(30) Foreign Application Priority Data

Nov. 12, 2020 (JP) ................................ 2020-188962

(51) Int. Cl.
*H01F 27/28* (2006.01)

(52) U.S. Cl.
CPC ..... *H01F 27/2828* (2013.01); *H01F 27/2885* (2013.01)

(58) Field of Classification Search
CPC ... H01F 27/29; H01F 27/2828; H01F 27/2885
See application file for complete search history.

(56) References Cited

U.S. PATENT DOCUMENTS 11,935,688 B2 * 3/2024 Yamamoto .......... H01F 27/2828
2020/0111601 A1 * 4/2020 Ohi ..................... H01F 27/2828
2020/0279685 A1 9/2020 Yamamoto et al.

FOREIGN PATENT DOCUMENTS

JP 2018-148078 A 9/2018
JP 2020-141077 A 9/2020

* cited by examiner

*Primary Examiner* — Shawki S Ismail
*Assistant Examiner* — Jose Enrique Vilanova
(74) *Attorney, Agent, or Firm* — Studebaker Brackett PLLC

(57) ABSTRACT

Heat is less likely to transfer from a terminal electrode to a wire. A coil component includes a core, a first terminal electrode provided on a first flange of the core, a winding portion wound around a winding core of the core, and a first wire having a first end. The first end of the first wire is electrically connected to the first terminal electrode. A part of the first end is spaced apart from the first terminal electrode.

19 Claims, 3 Drawing Sheets

COIL COMPONENT

CROSS-REFERENCE TO RELATED APPLICATION

This application claims benefit of priority to Japanese Patent Application No. 2020-188962, filed Nov. 12, 2020, the entire content of which is incorporated herein by reference.

BACKGROUND

Technical Field

The present disclosure relates to a coil component in which a wire is wound around a winding core of a core.

Background Art

Japanese Patent Application Laid-Open No. 2018-148078 discloses an example of a coil component in which a wire is wound around a winding core of a core. In this coil component, a terminal electrode is provided on a flange of the core, and an end of the wire is electrically connected to the terminal electrode.

An example of a method of electrically connecting the end of the wire to the terminal electrode will be described. For example, the end of the wire is temporarily fixed to the terminal electrode by thermal pressure bonding. By melting a metal constituting the terminal electrode in this state, a molten ball is created. The end of the wire can be electrically connected to the terminal electrode by the molten ball that become solidified.

SUMMARY

When the metal constituting the terminal electrode is melted to create the molten ball, heat of the terminal electrode is also transferred to the wire whose end is temporarily fixed to the terminal electrode. The larger an amount of heat transferred to the wire is, the more greatly the wire is damaged.

Accordingly, a coil component includes a core having a winding core and a flange connected to an end of the winding core in an axial direction of the winding core, a terminal electrode provided on the flange, and a wire having an end and a winding portion wound around the winding core. The end is electrically connected to the terminal electrode. A part of the end is spaced apart from the terminal electrode.

In the above configuration, a part of the end of the wire is spaced apart from the terminal electrode. Therefore, heat is less likely to transfer from the terminal electrode to the wire as compared with a case where the end of the wire as a whole is in contact with the terminal electrode.

The present disclosure makes heat less likely to transfer from the terminal electrode to the wire.

DETAILED DESCRIPTION

Hereinafter, an embodiment of a coil component will be described with reference to FIGS. 1 to 5. The drawings may show enlarged components to facilitate understanding. Dimensional ratios of the components may be different from those actual or those in another drawing. Although hatching is applied in a sectional view, hatching of some components may be omitted to facilitate understanding.

Figure 1:
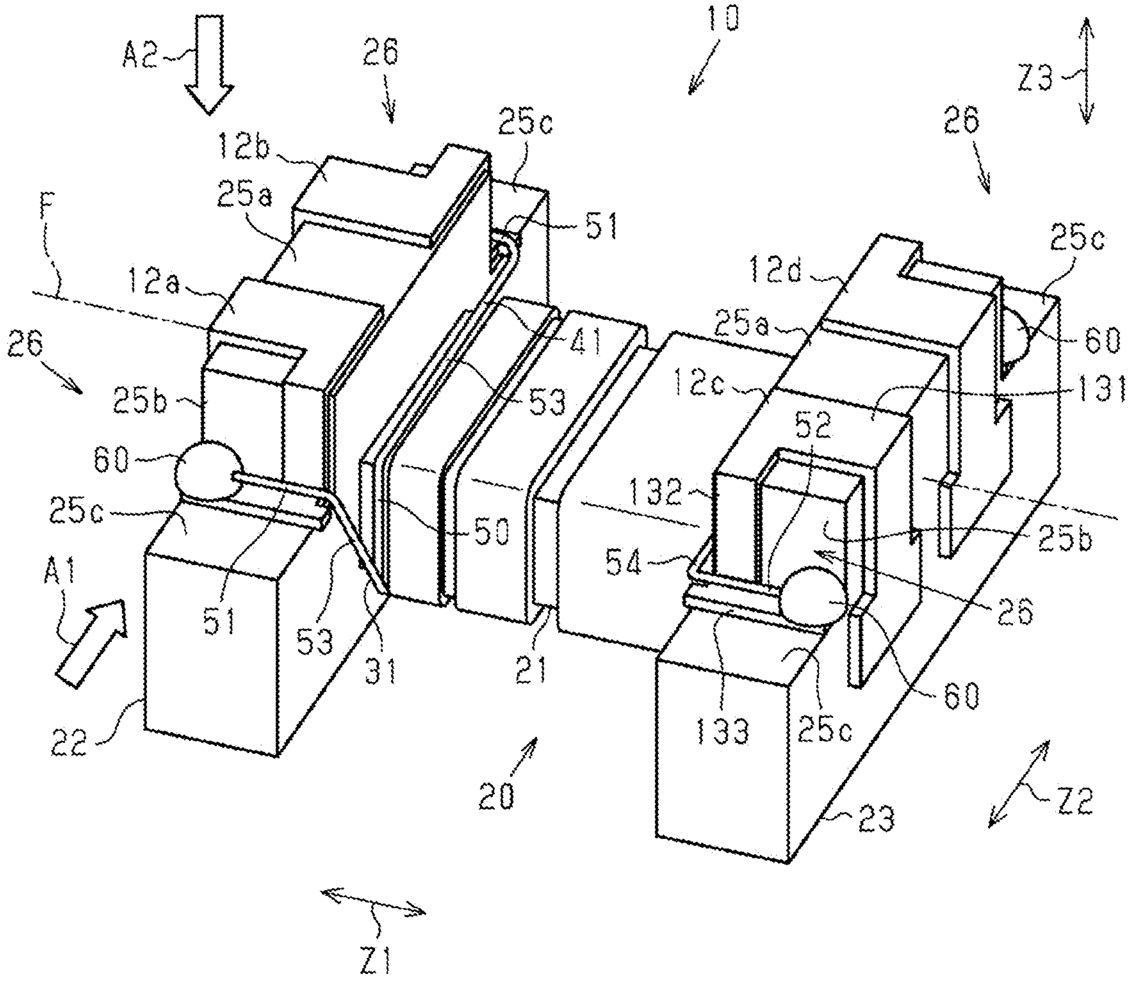
FIG. 1 is a schematic perspective view illustrating an embodiment of a coil component.

As illustrated in FIG. 1, a coil component 10 includes a core 20 and a plurality of wires 31 and 41 wound around the core 20. The coil component 10 is, for example, a common mode choke coil.

The core 20 contains, for example, an electrically insulating material. Specifically, the core 20 contains a non-magnetic material such as alumina or a resin, and a magnetic material such as ferrite or a magnetic powder-containing resin. The core 20 is preferably constituted by a sintered body such as alumina or ferrite.

The core 20 includes a winding core 21, a first flange 22 connected to a first end of the winding core 21 in an axial direction Z1, and a second flange 23 connected to a second end of the winding core 21 in the axial direction Z1. That is, the winding core 21 extending in the axial direction Z1 is disposed between a pair of the flanges 22 and 23 aligned in the axial direction Z1. The axial direction Z1 is an extending direction of a central axis F of the winding core 21.

Among side surfaces of the flanges 22 and 23, a side surface corresponding to a circuit board when the coil component 10 is mounted on the circuit board is referred to as a mounting surface 25*a*. In the embodiment, among directions orthogonal to the axial direction Z1, a direction along the mounting surface 25*a* is referred to as a first direction Z2, and a direction orthogonal to the mounting surface 25*a* is referred to as a second direction Z3.

Each of the flanges 22 and 23 protrudes outward in the first direction Z2 from the winding core 21 and protrudes outward in the second direction Z3 from the winding core 21. The mounting surface 25*a* is a side surface on a first side in the second direction Z3 of the flanges 22 and 23.

Recesses 26 are formed on both sides of each of the flanges 22 and 23 in the first direction Z2. By providing the recesses 26, each of the flanges 22 and 23 has, as side surfaces, a longitudinal side surface 25*b* connected to the mounting surface 25*a* and a lateral side surface 25*c* connected to the longitudinal side surface 25*b*.

In the embodiment, the longitudinal side surface 25*b* is formed such that an angle formed by the longitudinal side surface 25*b* and the mounting surface 25*a* is a right angle. The lateral side surface 25*c* is a plane parallel to the mounting surface 25*a*. However, it is sufficient that the angle formed by the longitudinal side surface 25*b* and the mounting surface 25*a* is substantially the right angle, and the angle need not be "90°". It is sufficient that the lateral side surface 25*c* is substantially parallel to the mounting surface 25*a*, and the lateral side surface 25*c* need not be precisely parallel to the mounting surface 25*a*.

The coil component 10 includes a first terminal electrode 12*a* and a second terminal electrode 12*b* provided on the first flange 22, and a third terminal electrode 12*c* and a fourth terminal electrode 12*d* provided on the second flange 23.

The first terminal electrode 12*a* and the third terminal electrode 12*c* are disposed on the first side with respect to the central axis F in the first direction Z2. The second terminal electrode 12*b* and the fourth terminal electrode 12*d* are disposed on the second side with respect to the central axis F in the first direction Z2. The second terminal electrode 12*b* is located at an equal position to the first terminal electrode 12*a* in the axial direction Z1. The fourth terminal electrode 12*d* is located at an equal position to the third terminal electrode 12*c* in the axial direction Z1.

Each of the terminal electrodes 12*a* to 12*d* is formed by processing a metal plate. That is, each of the terminal electrodes 12*a* to 12*d* has a base 131 located inside each of the recesses 26 in the first direction Z2. Each of the terminal electrodes 12*a* to 12*d* has a side wall 132 disposed along the longitudinal side surface 25*b*. The side wall 132 is connected to the base 131. Each of the terminal electrodes 12*a* to 12*d* has a connection 133 disposed on the lateral side surface 25*c*. The connection 133 is coupled to the side wall 132. That is, it can be said that the side wall 132 extends in the second direction Z3 from a connected part with the connection 133. Each connection 133 extends substantially in the axial direction Z1.

The first wire 31 and the second wire 41 are wound around the winding core 21 of the core 20. In the embodiment, the first wire 31 and the second wire 41 are wound around the winding core 21 by lap winding. That is, the first wire 31 is directly wound around the winding core 21, and the second wire 41 is wound around the winding core 21 over the first wire 31. The number of windings of the first wire 31 around the winding core 21 is substantially the same as the number of windings of the second wire 41 around the winding core 21.

A method of winding the first wire 31 and the second wire 41 around the winding core 21 need not be lap winding. For example, the first wire 31 and the second wire 41 may be wound around the winding core 21 by bifilar winding, or a region where the first wire 31 and the second wire 41 are wound around the winding core 21 by lap winding and a region where the first wire 31 and the second wire 41 are wound around the winding core 21 by bifilar winding may be both formed.

Each of the wires 31 and 41 has a winding portion 50, a first end 51, a second end 52, a first extended portion 53, and a second extended portion 54. The winding portion 50 is a part of the wires 31 and 41 wound around the winding core 21. FIG. 1 shows only a part of the winding portion 50. The first end 51 is a part of the wires 31 and 41 located at an equal position to the first flange 22 in the axial direction Z1. The second end 52 is a part of the wires 31 and 41 located at an equal position to the second flange 23 in the axial direction Z1. The first extended portion 53 is a part of the wires 31 and 41 connecting the winding portion 50 and the first end 51. The second extended portion 54 is a part of the wires 31 and 41 connecting the winding portion 50 and the second end 52.

The first end 51 of the first wire 31 is electrically connected to the connection 133 of the first terminal electrode 12*a*. That is, the first end 51 of the first wire 31 is electrically connected to the connection 133 by a molten ball 60 formed by dissolving a metal constituting the first terminal electrode 12*a*. That is, the molten ball 60, which becomes solidified as is simply referred to herein as the "molten ball 60", and electrically connects the first terminal electrode 12*a* and the first wire 31, contains the metal constituting the first terminal electrode 12*a*.

The first end 51 of the second wire 41 is electrically connected to the connection 133 of the second terminal electrode 12*b*. That is, the first end 51 of the second wire 41 is electrically connected to the connection 133 by the molten ball 60 formed by dissolving a metal constituting the second terminal electrode 12*b*. That is, the molten ball 60 electrically connecting the second terminal electrode 12*b* and the second wire 41 contains the metal constituting the second terminal electrode 12*b*.

The second end 52 of the first wire 31 is electrically connected to the connection 133 of the third terminal electrode 12*c*. That is, the second end 52 of the first wire 31 is electrically connected to the connection 133 by the molten ball 60 formed by dissolving a metal constituting the third terminal electrode 12*c*. That is, the molten ball 60 electrically connecting the third terminal electrode 12*c* and the first wire 31 contains the metal constituting the third terminal electrode 12*c*.

The second end 52 of the second wire 41 is electrically connected to the connection 133 of the fourth terminal electrode 12*d*. That is, the second end 52 of the second wire 41 is electrically connected to the connection 133 by the molten ball 60 formed by dissolving a metal constituting the fourth terminal electrode 12*d*. That is, the molten ball 60 electrically connecting the fourth terminal electrode 12*d* and the second wire 41 contains the metal constituting the fourth terminal electrode 12*d*.

Figure 2:
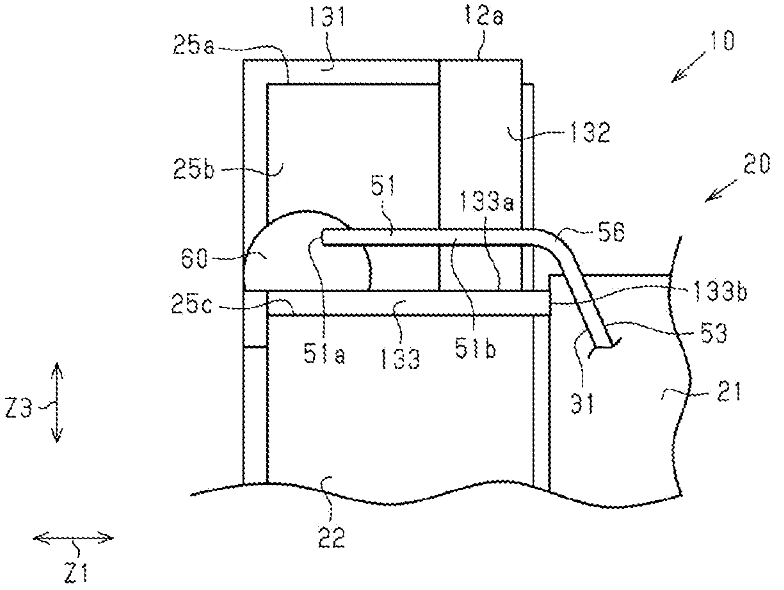
FIG. 2 is a schematic side view of a part of the coil component.
Figure 3:
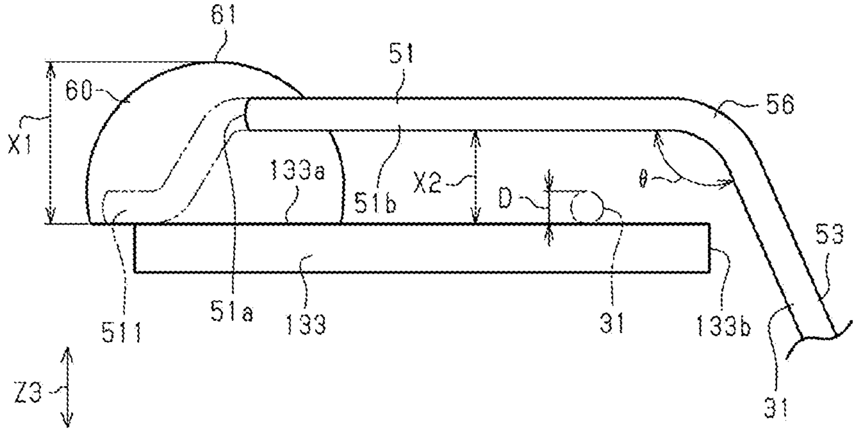
FIG. 3 is a schematic view illustrating a connection state between an end of a wire and a terminal electrode in the coil component.
Figure 4:
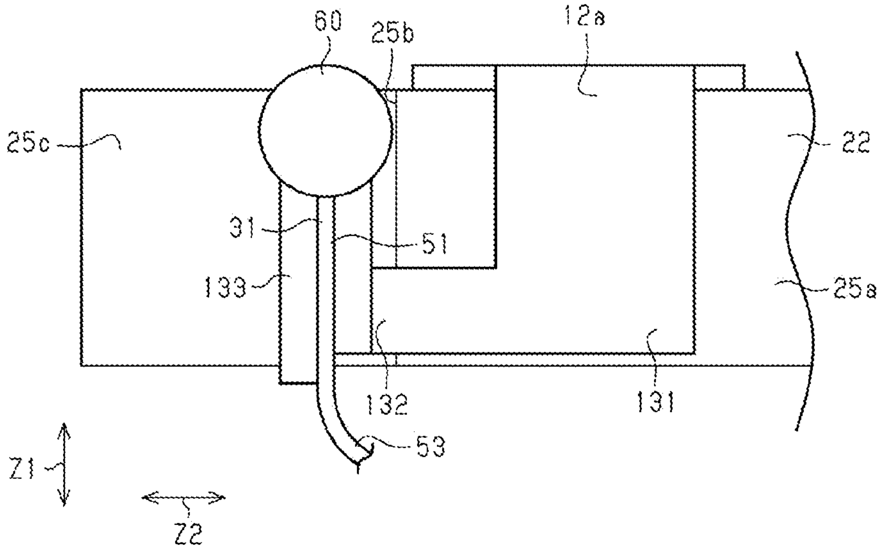
FIG. 4 is a schematic plan view of a part of the coil component.

Next, electrical connections between the terminal electrodes 12*a* to 12*d* and the ends of the wires 31 and 41 will be described in detail with reference to FIGS. 2 to 4. FIGS. 2 to 4 illustrate an electrical connection between the first terminal electrode 12*a* and the first end 51 of the first wire 31. FIG. 2 is a part of a side view of the coil component 10 when the first flange 22 is viewed from a white arrow A1 illustrated in FIG. 1. FIG. 4 is a part of a side view of the coil component 10 when the first flange 22 is viewed from a white arrow A2 illustrated in FIG. 1. The arrow A1 is an arrow extending in the first direction Z2. The arrow A2 is an arrow extending in the second direction Z3.

As illustrated in FIGS. 2 and 3, a part of the first end 51 is spaced apart from the connection 133 of the first terminal electrode 12*a*. Specifically, a tip 51*a* of the first end 51 is disposed in the molten ball 60. The molten ball 60 is located on an opposite side of the winding core 21 with respect to a center of the first flange 22 in the axial direction Z1. When a part of the first end 51 spaced apart from the connection 133 is referred to as a "separate portion 51*b*", the separate portion 51*b* is disposed between the molten ball 60 and the winding core 21 in the axial direction Z1. That is, the separate portion 51*b* is connected to the first extended portion 53 of the first wire 31. A bent portion 56 that changes an extending direction of the first wire 31 is provided at a boundary between the separate portion 51*b* and the first extended portion 53.

A surface of the connection 133 is defined as a reference surface 133*a*. In this case, a gap between the reference surface 133*a* and the first wire 31 is preferably larger than or equal to a diameter D of the first wire 31. In the embodiment, the gap is larger than the diameter D of the first wire 31.

As illustrated in FIG. 2, a part of the reference surface 133*a* closer to the winding core 21 in the axial direction Z1 than the molten ball 60 is an opposing surface facing the separate portion 51*b*. In the embodiment, the separate portion 51*b* extends in a direction along the reference surface 133*a*. That is, the separate portion 51*b* is parallel to the reference surface 133*a*.

Of both ends of the connection 133 in the axial direction Z1, an end closer to the winding core 21 is referred to as an inner end 133*b* of the connection 133. In this case, the first wire 31 is not in contact with the inner end 133*b*.

As illustrated in FIG. 3, a positional relationship of the separate portion 51*b* with respect to the reference surface 133*a* preferably satisfies the following relational expression (Formula 1). In the relational expression (Formula 1), "X1" is a dimension of the molten ball 60 in a height direction. When a part of the molten ball 60 farthest from the reference surface 133*a* in the second direction Z3 is defined as a tip 61 of the molten ball 60, the dimension of the molten ball 60 in the height direction is a distance between the reference surface 133*a* and the tip 61 in the second direction Z3. That is, a dimension of the molten ball 60 in the second direction Z3 is "X1". In the relational expression (Formula 1), "X2" is a dimension from the reference surface 133*a* to the separate portion 51*b* in the second direction Z3 corresponding to the height direction.

$$0<X2\leq X1\cdot 4/5 \qquad \text{(Formula 1)}$$

Accordingly, in the second direction Z3, the bent portion 56 of the first wire 31 is disposed between the tip 61 of the molten ball 60 and the reference surface 133*a*. Furthermore, in the second direction Z3, the first extended portion 53 of the first wire 31 is disposed on an opposite side of the tip 61 across the bent portion 56.

As illustrated in FIG. 4, the separate portion 51*b* of the first end 51 of the first wire 31 is not in contact with the side wall 132 of the first terminal electrode 12*a*. That is, the separate portion 51*b* is located outside the side wall 132 in the first direction Z2.

An electrical connection state between the second end 52 of the first wire 31 and the third terminal electrode 12*c*, an electrical connection state between the first end 51 of the second wire 41 and the second terminal electrode 12*b*, and an electrical connection state between the second end 52 of the second wire 41 and the fourth terminal electrode 12*d* are equivalent to an electrical connection state between the first end 51 of the first wire 31 and the first terminal electrode 12*a*. Therefore, a detailed description thereof will be omitted.

Figure 5:
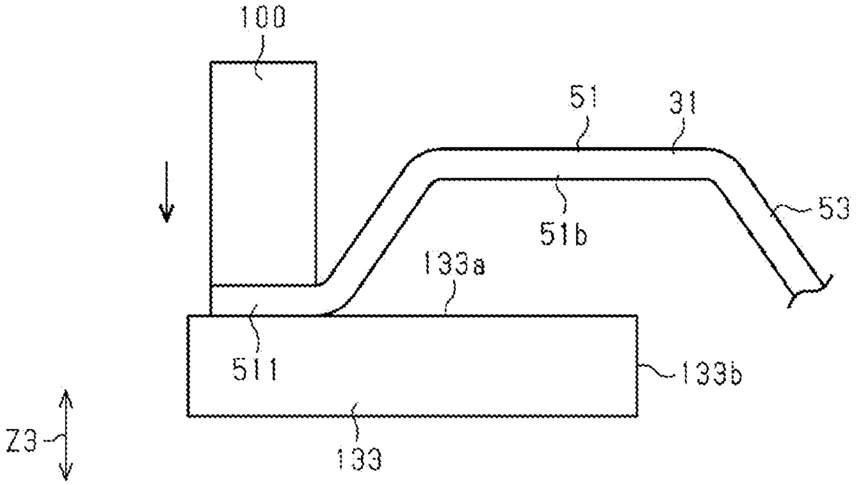
FIG. 5 is a schematic view illustrating a state in which the end of the wire is temporarily fixed to the terminal electrode when the coil component is produced.

Next, an example of a method of electrically connecting the first end 51 of the first wire 31 to the first terminal electrode 12*a* will be described with reference to FIG. 5. An edge 511 of the first end 51 is pressed against the connection 133 of the first terminal electrode 12*a* by a pressing member 100 in a direction indicated by an arrow in FIG. 5. At this time, heat is applied to the edge 511 together with a pressing force. As a result, the edge 511 is temporarily fixed to the connection 133 by thermal pressure bonding. At this time, no pressing force is applied to a part of the first end 51 other than the edge 511. Therefore, the part of the first end 51 other than the edge 511 is separated from the reference surface 133*a* of the connection 133 in the second direction Z3. That is, the separate portion 51*b* is formed.

When the temporary fixing is completed in this manner, the metal constituting the first terminal electrode 12*a* is irradiated with a laser beam, and the metal is melted. At this time, a part of the first end 51 in contact with the first terminal electrode 12*a* and a periphery of the part are also melted. Thus, the molten ball 60 is created. Then, as illustrated in FIG. 2, the first end 51 of the first wire 31 is electrically connected to the first terminal electrode 12*a* by the molten ball 60. In FIG. 3, a part indicated by a two-dot chain line of the first wire 31 is a part melted when the molten ball 60 is created.

When the first terminal electrode 12*a* is irradiated with the laser beam, heat due to the irradiation of the laser beam is generated in the first terminal electrode 12*a*. At this time, in a case where the first end 51 of the first wire 31 is as a whole in contact with the first terminal electrode 12*a*, an amount of heat transferred from the first terminal electrode 12*a* to the first wire 31 increases, and the first wire 31 is greatly damaged.

On the other hand, in the embodiment, a part of the first end 51 of the first wire 31 is not in contact with the first terminal electrode 12*a*. Thus, when the molten ball 60 is formed, the amount of heat transferred from the first terminal electrode 12*a* to the first wire 31 can be reduced. Accordingly, damage to the first wire 31 can be reduced.

In the embodiment, the following effects can be further obtained.

(1) A gap is interposed between each of the terminal electrodes 12*a* to 12*d* and the separate portion 51*b* of the wires 31 and 41. Therefore, when the coil component 10 is solder-mounted on the circuit board, the solder enters between each of the terminal electrodes 12*a* to 12*d* and the separate portion 51*b* of the wires 31 and 41. This can increase a connection strength when the coil component 10 is mounted on the circuit board.

(2) In the embodiment, as illustrated in FIG. 2, the wires 31 and 41 are not in contact with the inner end 133*b* of the connection 133 of each of the terminal electrodes 12*a* to 12*d*. As a result, it is possible to suppress disconnection of the wires 31 and 41 as compared with a case where the wires 31 and 41 are in contact with the inner end 133*b*.

(3) In the embodiment, a gap between the reference surface 133*a* of the connection 133 of each of the terminal electrodes 12*a* to 12*d* and the separate portion 51*b* of the wires 31 and 41 is larger than the diameter D of the wires 31 and 41. Therefore, as compared with a case where the separate portion Mb is close to the reference surface 133*a* of the connection 133, heat is less likely to transfer from the connection 133 of each of the terminal electrodes 12*a* to 12*d* to the wires 31 and 41.

(4) In the embodiment, the separate portion Mb of the wires 31 and 41 are disposed between the tip 61 of the molten ball 60 and the reference surface 133*a* in the second direction Z3. Accordingly, when the molten ball 60 is formed to electrically connect the wires 31 and 41 to the terminal electrodes 12*a* to 12*d*, the occurrence of connection failure can be reduced.

(5) In the embodiment, as illustrated in FIG. 3, an angle θ formed between each of the ends 51 and 52 of the wires 31 and 41 and each of the extended portions 53 and 54 is larger than "90°" and smaller than "180°". As a result, a stress on the wires 31 and 41 can be reduced as compared with the case where the angle θ is less than or equal to "90°". Accordingly, when the molten ball 60 is formed to electrically connect the wires 31 and 41 to the terminal electrodes 12*a* to 12*d*, the occurrence of connection failure can be reduced.

(6) In the embodiment, as illustrated in FIG. 4, the wires 31 and 41 are not in contact with the side walls 132 of the terminal electrodes 12*a* to 12*d*, either. As a result, the amount of heat transferred from the wires 31 and 41 from the connection 133 of each of the terminal electrodes 12*a* to 12*d* can be further reduced.

(7) In the embodiment, the above relational expression (Formula 1) is satisfied. Accordingly, when the molten ball 60 is formed to electrically connect the wires 31 and 41 to the terminal electrodes 12*a* to 12*d*, the occurrence of connection failure can be reduced.

The above embodiment can be modified as follows. The embodiment and the following modifications can be implemented in combination with each other so as not to technically contradict.

One of the first end 51 or the second end 52 of the first wire 31 may be in contact with the side walls 132 of the terminal electrode 12*a* or 12*c*.

One of the first end 51 or the second end 52 of the second wire 41 may be in contact with the side wall 132 of the terminal electrode 12*b* or 12*d*. The separate portion 51*b* of the first end 51 of the first wire 31 need not be parallel to the reference surface 133*a* of the connection 133 of the first terminal electrode 12*a*.

The separate portion 51*b* of the second end 52 of the first wire 31 need not be parallel to the reference surface 133*a* of the connection 133 of the third terminal electrode 12*c*. The separate portion 51*b* of the first end 51 of the second wire 41 need not be parallel to the reference surface 133*a* of the connection 133 of the second terminal electrode 12*b*.

The separate portion 51*b* of the second end 52 of the second wire 41 need not be parallel to the reference surface 133*a* of the connection 133 of the fourth terminal electrode 12*d*. A positional relationship between the separate portion 51*b* of the first end 51 of the first wire 31 and the reference surface 133*a* of the connection 133 of the first terminal electrode 12*a* need not satisfy the relational expression (Formula 1).

A positional relationship between the separate portion 51*b* of the second end 52 of the first wire 31 and the reference surface 133*a* of the connection 133 of the third terminal electrode 12*c* need not satisfy the relational expression (Formula 1).

A positional relationship between the separate portion 51*b* of the first end 51 of the second wire 41 and the reference surface 133*a* of the connection 133 of the second terminal electrode 12*b* need not satisfy the relational expression (Formula 1).

A positional relationship between the separate portion 51*b* of the second end 52 of the second wire 41 and the reference surface 133*a* of the connection 133 of the fourth terminal electrode 12*d* need not satisfy the relational expression (Formula 1).

The first extended portion 53 of the first wire 31 may have a part located on an opposite side of the reference surface 133*a* across the bent portion 56 in the second direction Z3. The second extended portion 54 of the first wire 31 may have a part located on the opposite side of the reference surface 133*a* across the bent portion 56 in the second direction Z3.

The first extended portion 53 of the second wire 41 may have a part located on the opposite side of the reference surface 133*a* across the bent portion 56 in the second direction Z3. The second extended portion 54 of the second wire 41 may have a part located on the opposite side of the reference surface 133*a* across the bent portion 56 in the second direction Z3.

The bent portion 56 provided at a boundary between the first end 51 and the first extended portion 53 of the first wire 31 may be located on an opposite side of the tip 61 of the molten ball 60 across the reference surface 133*a* in the second direction Z3.

The bent portion 56 provided at a boundary between the second end 52 and the second extended portion 54 of the first wire 31 may be located on the opposite side of the tip 61 of the molten ball 60 across the reference surface 133*a* in the second direction Z3.

The bent portion 56 provided at a boundary between the first end 51 and the first extended portion 53 of the second wire 41 may be located on the opposite side of the tip 61 of the molten ball 60 across the reference surface 133*a* in the second direction Z3.

The bent portion 56 provided at a boundary between the second end 52 and the second extended portion 54 of the second wire 41 may be located on the opposite side of the tip 61 of the molten ball 60 across the reference surface 133*a* in the second direction Z3.

A gap between at least a part of the separate portion 51*b* of the first end 51 of the first wire 31 and the reference surface 133*a* may be smaller than the diameter D of the first wire 31. A gap between at least a part of the separate portion 51*b* of the second end 52 of the first wire 31 and the reference surface 133*a* may be smaller than the diameter D of the first wire 31.

A gap between at least a part of the separate portion 51*b* of the first end 51 of the second wire 41 and the reference surface 133*a* may be smaller than the diameter D of the first wire 31. A gap between at least a part of the separate portion 51*b* of the second end 52 of the second wire 41 and the reference surface 133*a* may be smaller than the diameter D of the first wire 31.

The first wire 31 may be in contact with the inner end 133*b* of the connection 133 of the first terminal electrode 12*a*. The first wire 31 may be in contact with the inner end 133*b* of the connection 133 of the third terminal electrode 12*c*.

The second wire 41 may be in contact with the inner end 133*b* of the connection 133 of the second terminal electrode 12*b*. The second wire 41 may be in contact with the inner end 133*b* of the connection 133 of the fourth terminal electrode 12*d*.

If the separate portion 51*b* can be formed at the first end 51 of the first wire 31, the first end 51 may be electrically connected to the first terminal electrode 12*a* by a method different from the method of electrically connecting the first end 51 to the first terminal electrode 12*a* using the molten ball 60. For example, the first end 51 may be electrically connected to the first terminal electrode 12*a* using solder.

If the separate portion 51*b* can be formed at the second end 52 of the first wire 31, the second end 52 may be electrically connected to the third terminal electrode 12*c* by a method different from the method of electrically connecting the second end 52 to the third terminal electrode 12*c* using the molten ball 60. For example, the first end 51 may be electrically connected to the first terminal electrode 12*a* using solder.

If the separate portion 51*b* can be formed at the first end 51 of the second wire 41, the second end 52 may be electrically connected to the second terminal electrode 12*b* by a method different from the method of electrically connecting the first end 51 to the second terminal electrode 12*b* using the molten ball 60. For example, the first end 51 may be electrically connected to the first terminal electrode 12*a* using solder.

If the separate portion 51*b* can be formed at the second end 52 of the second wire 41, the second end 52 may be electrically connected to the fourth terminal electrode 12*d* by a method different from the method of electrically connecting the second end 52 to the fourth terminal electrode 12*d* using the molten ball 60. For example, the first end 51 may be electrically connected to the first terminal electrode 12*a* using solder.

If a part of the ends of the wires 31 and 41 is spaced apart from the connection 133 of the terminal electrode, the remaining part of the ends of the wires 31 and 41 may be in contact with the connection 133. In the coil component, only one wire may be wound around the core.

The coil component need not be a common mode choke coil.

What is claimed is:

1. A coil component comprising:
a core including a winding core and a flange connected to an end of the winding core in an axial direction of the winding core;
a terminal electrode on the flange;
a wire having an end and a winding portion wound around the winding core; and
a ball electrically connecting the terminal electrode and the end of the wire, wherein
a part of the end of the wire is spaced apart from the terminal electrode,
the wire has an extended portion connecting the end of the wire and the winding portion,
a bent portion of the wire that changes an extending direction of the wire is provided at a boundary between the end of the wire and the extended portion of the wire,
a surface of the terminal electrode on which the ball exists among surfaces of the terminal electrode is defined as a reference surface of the terminal electrode,
a direction orthogonal to the reference surface is defined as a height direction,
a part of the ball farthest from the reference surface in the height direction is defined as a tip of the ball, and
the bent portion of the wire is located between the tip of the ball and the reference surface of the terminal electrode and spaced apart from the reference surface in the height direction.

2. The coil component according to claim 1, wherein
the ball contains a metal constituting the terminal electrode.

3. The coil component according to claim 2, wherein
an end of the terminal electrode closer to the winding core of opposite ends of the terminal electrode in the axial direction is defined as an inner end of the terminal electrode, the wire is spaced apart from the inner end of the terminal electrode.

4. The coil component according to claim 3, wherein
a distance between the terminal electrode and a separate portion that is the part of the end of the wire spaced apart from the terminal electrode is larger than or equal to a diameter of the wire.

5. The coil component according to claim 3, wherein
the part of the end of the wire spaced apart from the terminal electrode is defined as a separate portion, and a surface of the terminal electrode facing the separate portion is defined an opposing surface, the separate portion is parallel to the opposing surface of the terminal electrode.

6. The coil component according to claim 2, wherein
a distance between the terminal electrode and a separate portion that is the part of the end of the wire spaced apart from the terminal electrode is larger than or equal to a diameter of the wire.

7. The coil component according to claim 6, wherein
the part of the end of the wire spaced apart from the terminal electrode is defined as a separate portion, and a surface of the terminal electrode facing the separate portion is defined an opposing surface, the separate portion is parallel to the opposing surface of the terminal electrode.

8. The coil component according to claim 2, wherein
the part of the end of the wire spaced apart from the terminal electrode is defined as a separate portion, and a surface of the terminal electrode facing the separate portion is defined an opposing surface, the separate portion is parallel to the opposing surface of the terminal electrode.

9. The coil component according to claim 1, wherein
an end of the terminal electrode closer to the winding core of opposite ends of the terminal electrode in the axial direction is defined as an inner end of the terminal electrode, the wire is spaced apart from the inner end of the terminal electrode.

10. The coil component according to claim 9, wherein
a distance between the terminal electrode and a separate portion that is the part of the end of the wire spaced apart from the terminal electrode is larger than or equal to a diameter of the wire.

11. The coil component according to claim 9, wherein
the part of the end of the wire spaced apart from the terminal electrode is defined as a separate portion, and a surface of the terminal electrode facing the separate portion is defined an opposing surface, the separate portion is parallel to the opposing surface of the terminal electrode.

12. The coil component according to claim 1, wherein
a distance between the terminal electrode and a separate portion that is the part of the end of the wire spaced apart from the terminal electrode is larger than or equal to a diameter of the wire.

13. The coil component according to claim 12, wherein
the part of the end of the wire spaced apart from the terminal electrode is defined as a separate portion, and a surface of the terminal electrode facing the separate portion is defined an opposing surface, the separate portion is parallel to the opposing surface of the terminal electrode.

14. The coil component according to claim 1, wherein
the extended portion of the wire is located on an opposite side of the tip of the ball across the bent portion of the wire in the height direction.

15. The coil component according to claim 14, wherein
the part of the end of the wire spaced apart from the terminal electrode is defined as a separate portion,
a dimension of the ball in the height direction is denoted by X1, and
a dimension between the reference surface of the terminal electrode and the separate portion in the height direction is denoted by X2, $$0<X2\leq X1\cdot 4/5$$

is satisfied.

16. The coil component according to claim 1, wherein
the part of the end of the wire spaced apart from the terminal electrode is defined as a separate portion,
a dimension of the ball in the height direction is denoted by X1, and
a dimension between the reference surface of the terminal electrode and the separate portion in the height direction is denoted by X2, $$0<X2\leq X1\cdot 4/5$$

is satisfied.

17. The coil component according to claim 1, wherein
the part of the end of the wire spaced apart from the terminal electrode is defined as a separate portion, and a surface of the terminal electrode facing the separate portion is defined an opposing surface, the separate portion is parallel to the opposing surface of the terminal electrode.

18. The coil component according to claim 1, wherein
the terminal electrode includes a connection having the reference surface and a side wall extending in the height direction from a connected part with the connection, and
at least the part of the end of the wire is spaced apart from the side wall.

19. The coil component according to claim 1, wherein
an end of the terminal electrode closer to the winding core of opposite ends of the terminal electrode in the axial direction is defined as an inner end of the terminal electrode, and
a second part of the wire spaced from the part of the wire is over and spaced apart from the inner end of the terminal electrode in the height direction.

* * * * *